United States Patent
Aschoff et al.

(10) Patent No.: US 11,356,784 B2
(45) Date of Patent: Jun. 7, 2022

(54) METHOD OF OPERATING A HEARING DEVICE SYSTEM, AND HEARING DEVICE SYSTEM

(71) Applicant: Sivantos Pte. Ltd., Singapore (SG)

(72) Inventors: Stefan Aschoff, Eckental (DE); Alexander Schmidt, Nuremberg (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/120,521

(22) Filed: Dec. 14, 2020

(65) Prior Publication Data

US 2021/0185456 A1    Jun. 17, 2021

(30) Foreign Application Priority Data

Dec. 13, 2019  (DE) .......................... 102019219563.6

(51) Int. Cl.
*H04R 25/00* (2006.01)
*H04W 4/21* (2018.01)
*G06F 16/9536* (2019.01)

(52) U.S. Cl.
CPC ....... *H04R 25/554* (2013.01); *G06F 16/9536* (2019.01); *H04W 4/21* (2018.02); *H04R 2225/55* (2013.01)

(58) Field of Classification Search
CPC .......................... H04R 25/554; H04R 2225/55
USPC ....................................................... 381/315
See application file for complete search history.

(56) References Cited

U.S. PATENT DOCUMENTS

| | | | |
|---|---|---|---|
| 9,854,559 | B2 | 12/2017 | Gao et al. |
| 10,432,742 | B2 | 10/2019 | Gelfenbeyn et al. |
| 2013/0144623 | A1 | 6/2013 | Lord et al. |
| 2016/0092562 | A1 | 3/2016 | McGinley |
| 2020/0184845 | A1 | 6/2020 | Tanaka |

FOREIGN PATENT DOCUMENTS

| | | | |
|---|---|---|---|
| CN | 103685713 A | 3/2014 | |
| CN | 104615675 A | 5/2015 | |
| CN | 104780271 A | 7/2015 | |
| CN | 104967732 A | 10/2015 | |
| CN | 105205457 A | 12/2015 | |
| CN | 105516895 A | 4/2016 | |
| CN | 107113222 A | 8/2017 | |
| CN | 107590141 A | 1/2018 | |
| DE | 102018209821 A1 | 5/2019 | |
| DE | 102019219510 B3 * | 12/2020 | ............. H04R 25/43 |
| EP | 2814264 A1 | 12/2014 | |
| JP | 2019185077 A | 10/2019 | |

* cited by examiner

*Primary Examiner* — Phylesha Dabney
(74) *Attorney, Agent, or Firm* — Laurence A. Greenberg; Werner H. Stemer; Ralph E. Locher

(57) ABSTRACT

During the operation of a hearing device system, there is received information characteristic of an encounter between a hearing device wearer wearing a hearing device and another person. The information is taken as a basis for indicating that the hearing device wearer has met or is about to meet the other person. Background information about the other person is collected from at least one social network, and the background information about the other person is converted into audio data. The audio data are audibly presented to the hearing device wearer by way of the hearing device of the hearing device wearer.

11 Claims, 2 Drawing Sheets

METHOD OF OPERATING A HEARING DEVICE SYSTEM, AND HEARING DEVICE SYSTEM

CROSS-REFERENCE TO RELATED APPLICATION

This application claims the priority, under 35 U.S.C. § 119, of German patent application DE 10 2019 219 563, filed Dec. 13, 2019; the prior application is herewith incorporated by reference in its entirety.

BACKGROUND OF THE INVENTION

Field of the Invention

The invention relates to a method for operating a hearing device system. In addition, the invention also relates to a hearing device system.

Hearing devices are used in particular in the form of hearing aids to take care of people who have limited hearing. To this end, hearing devices are regularly equipped with at least one microphone for picking up ambient sounds, a signal processor for (optionally frequency-specific) filtering, amplification and/or attenuation of signals or signal components captured by means of the microphone, and a loudspeaker for outputting the processed signals to the ear of the person wearing the hearing device (known as the hearing device wearer). Besides hearing devices, headphones, headsets, what are known as "hearables" or the like are also covered by the term "hearing device". In the case of hearing aids, a so-called bone conduction receiver or a cochlear implant can also be used instead of the loudspeaker to mechanically or electrically stimulate the ear of the hearing device wearer.

Often, hearing device wearers are comparatively elderly people whose hearing has declined on account of age, possibly also additionally on account of damage (for example as a result of noise due to a profession, acoustic traumas, etc.). In some cases, however, such people also have weaknesses in relation to remembering information concerning other people and/or in relation to information retrieval per se. This may decrease social interaction for such people, since for example they feel ashamed to ask other people, in particular acquaintances, about their background, perhaps even repeatedly if memory is reduced.

BRIEF SUMMARY OF THE INVENTION

It is accordingly an object of the invention to provide a method of operating a hearing device system, a hearing device system, which overcome the above-mentioned disadvantages of the heretofore-known devices and methods of this general type and which renders social interaction with other people more agreeable for hearing device wearers.

With the above and other objects in view there is provided, in accordance with the invention, a method of operating a hearing device system, the method comprising:

receiving information characteristic for an encounter between a hearing device wearer wearing a hearing device and another person;

wherein the characteristic information for the encounter is an identifier transmitted when an electronic device of the other person registers on a local area network of the hearing device wearer; or wherein the characteristic information for the encounter is an imminent event stored in an electronic calendar of the hearing device wearer;

taking the information as a basis for indicating that the hearing device wearer has met or is about to meet the other person;

collecting background information about the other person from at least one social network;

converting the background information about the other person into audio data, and audibly presenting the audio data to the hearing device wearer by way of the hearing device of said hearing device wearer.

The method according to the invention is used for operating a hearing device system that comprises at least one hearing device. The method first involves information characteristic of an encounter between a hearing device wearer wearing the hearing device and another person—who is preferably known to the hearing device wearer—being received. This information is taken as a basis for indicating that the hearing device wearer has met or is about to meet this other person. Background information about the person is then collected from at least one social network. At least some of this background information about the other person is converted into audio data. These audio data are subsequently audibly presented to the hearing device wearer by way of the hearing device of said hearing device wearer.

This method is preferably—at least in respect of information retrieval—performed fully automatically. In this case, the hearing device wearer is therefore advantageously provided with the afore-mentioned background information pertaining to the person whom the hearing device wearer is currently encountering or is about to encounter without the active involvement of said hearing device wearer. Alternatively, the hearing device wearer is notified of "intermediate states" of the method and/or approvals for the next steps are collected from him. Therefore the hearing device wearer—in both variants—thus does not need to ask the other person for background information, which can sometimes be disagreeable for the hearing device wearer, or even to proactively seek him in a social network, which, particularly for elderly hearing device wearers, is not possible owing to inhibitions in regard to the use of computer technology. The method according to the invention therefore affords great potential for a hearing device wearer who might be withdrawn to continue or resume participation in social interactions.

In respect of the "intermediate states," the hearing device wearer is provided with the identity of the person who is encountering him, for example, and asked whether background information needs to be obtained about this person.

In one method variant, the characteristic information for the hearing device wearer's encounter with the person that is used is an identifier transmitted when an electronic device, in particular a mobile device, preferably a smartphone, a smartwatch or a tablet, of the known person registers on a local area network (in particular a wireless network) of the hearing device wearer.

In a fundamentally conceivable variant, the hearing device itself is configured to set up a wireless local area network with other electronic devices.

Preferably, however, the hearing device is—optionally directly, but preferably indirectly via an electronic device, in particular a mobile device, for example a smartphone, a smartwatch, a tablet or the like, of the hearing device wearer—incorporated in a network, preferably a "home network", in particular registered on a router of the hearing device wearer.

When an electronic device registers in the network, preferably on the applicable router, what is known as the MAC address or a comparable, unique identifier of this device is transmitted to all devices situated in the network, i.e. registered (preferably on the router). The hearing device, preferably at least the electronic device, of the hearing device wearer therefore has the identifier of the electronic device of the other person transmitted to it as soon as this device registers in the network.

Optionally, this requires the hearing device wearer to communicate a network key to the other person so that the latter's device can register in the network (at least the first time). Alternatively—in particular in the case of a network operated on an open basis—the use of such a network key may also be dispensed with.

Optionally, the aforementioned (mobile) device of the hearing device wearer is configured to form a local area network, in particular by itself providing its communication module, in particular a wireless (preferably a WLAN radio connection) module configured as an access point (for example a "wireless access point"), a (in particular DHCP) server and an Internet connection by means of the mobile radio network. The presence of the router is thus not necessary in this case.

In an alternative method variant, the characteristic information for the encounter that is used is an imminent event stored in an electronic diary that is optionally at least indirectly connected to the hearing device of the hearing device wearer. By way of example, such a diary is installed or linked in the above-described (mobile) device of the hearing device wearer. The appointment stored in such a diary for a meeting with the other person is thus advantageously used to indicate the actual encounter between the hearing device wearer and the other person. By way of example, a reminder stored for this appointment is used in this instance as a trigger (in particular as the aforementioned characteristic information) for the method for collecting the background information and communicating it to the hearing device wearer that is described here and below. Alternatively, the applicable method is triggered at stipulated times, in particular at times stipulated on a user-specific basis, for example at the beginning of the appointment, 10 minutes beforehand or the like. This has the advantage that the background information can be collected and transmitted to the hearing device wearer as a kind of preparation for the appointment.

In a further expedient method variant, when the characteristic information for the encounter is available it is ascertained whether the hearing device wearer is known to the other person. This preferably involves an in particular electronically stored (preferably on the above-described electronic device) address book of the hearing device wearer being searched for this person. Preferably, for example when this person first logs into the network, his identifier is linked to the address book entry so that the identity of the person can be determined easily and unambiguously on the basis of the identifier when he logs in again.

In one variant, the hearing device wearer can assign the identifier of the other person to the address book entry himself (when the other person logs into the network for the first time). For example this is accomplished upon login for the first time by virtue of the router controlling an application on the device of the hearing device wearer that notifies the hearing device wearer of the "login event" and asks for the identity of the person who has just logged in, who the hearing device wearer should know—since he normally needs to communicate his network key.

Preferably, however, when the other person logs in, in particular for the first time, the router of the hearing device wearer makes a connection to a web service, which in turn sets up a website on the (mobile) device of the other person. On this website, the other person is asked to input his name (for example an "alias") and possibly also other personal data (for example a photograph) or to upload it/them to the web service by means of the website. The web service then links these data to the identifier. Optionally, the data linked to the identifier are transmitted to the (mobile) device or the router of the hearing device wearer and/or stored in a memory assigned to the web service. This means that the hearing device wearer himself does not need to take any action.

In an alternative or else additional (in particular in regard to the use of the above diary) method variant, the characteristic information for the encounter that is used is information, preferably a notification, that is used by a service used by the other person to communicate his location. Such a service is preferably installed executably on the electronic device of the other person and for example configured to—in particular automatically—notify the hearing device wearer (optionally also others, for example all "contacts" stored in the address book of the electronic device of the other person) of the location of the other person. Preferably, to this end, the same service is installed (preferably in the form of a software application) on the (mobile) device of the hearing device wearer and linked to the service used by the other person (in particular his software application) for the purpose of information exchange.

In a further alternative or else additional method variant, a voice recognition module of the hearing device of the hearing device wearer is used to recognize the voice of the other person (in particular by comparing it with stored voice patterns of known people) and hence to indicate the encounter with this other person. Put another way, the recognized voice is used as characteristic information for the encounter with the other person (whose voice pattern in this case is preferably already known, that is to say stored).

In order to collect the background information about the person, identification data linked to the person are, in a preferred method variant, made available to an in particular cloud-based query service—for example by the aforementioned web service, the router or the (mobile) device of the hearing device wearer. These identification data contain in particular the name (in particular first name and surname), a date of birth, an account name (or else: "alias" or "nickname"; if known), an e-mail address and/or the like. The query service is used to distribute queries pertaining to the other person to at least one, preferably various, social network(s), in particular on the basis of the identification data.

In one variant, the query service "enquires" directly with a social network. Put another way, the query service sends an enquiry—preferably formulated for the respective network—to an input interface of the social network, comparable with a search for a person on the Internet. In a particularly expedient variant, however, preferably the manufacturer of the hearing device has what is known as third party software (also: "developer module") in place on the social network or on various social networks (in particular "hosted" by the applicable social network). This third party software is used in particular to be able to optimize, at least to be able to speed up a query time for, queries but also in order to be able to compile data from the applicable network that actually need to be retrieved. Optionally, the third party software is also configured to use a query to look only for preset data pertaining to the respective person.

In a preferred method variant, the collected background information about the other person is consolidated before output to the hearing device wearer. This consolidation is preferably performed by the (e.g., cloud-based) query service. The consolidation in this case has the advantage that the hearing device wearer is confronted only by a limited amount of information.

In one expedient development, the consolidation involves date-based sorting, erasure of duplicate information (for example formed by identical information from different social networks), consideration of information only from a more recent date in relation to a preceding query or from a reference date, and/or subject-based filtering. By way of example, only information from a more recent date, which the hearing device wearer can optionally stipulate himself and/or which is possibly set to the last query time, is output in this case. Filtering involves for example only subjects that interest the hearing device wearer being taken into consideration—by way of example, his interests have been stored, possibly with reference to people or groups of people (for example differently for the specific person, relatives and acquaintances). This can be accomplished by using for example electronic notebooks, optionally an audio notebook available for hearing device wearers (for example known from DE 10 2018 209 821 A1) and the like, which are approved for the query service to inspect. Furthermore, as an alternative or in addition, subjects deemed by the other person or generally to be of particular interest are also taken into consideration, for example school-leaving certificate, professional training, marriage, sickness, participation in events, success in sport, for example, and the like.

In a further expedient method variant, the audio data to be presented to the hearing device wearer are created by the query service and transmitted to the hearing device—possibly via the interposed electronic device, for example the smartphone of the hearing device wearer. This means that the hearing device itself does not require any processing power for creating the audio data.

In an advantageous method variant, the audible presentation of the audio data to the hearing device wearer is provided only on approval by the hearing device wearer himself. Optionally, the hearing device wearer is provided with the opportunity to play back the audio data immediately or at a later time (for example by means of appropriate operation of a control element of the hearing device or of the mobile device possibly involved in the method). This allows the hearing device wearer to possibly choose an appropriate time for the presentation himself or to reject the presentation in an unfavorable situation. A clash between the audible presentation and a conversation—possibly with the other person himself—can therefore be prevented. By way of example, it is possible—in the case of an invitation or the like—for the hearing device wearer to listen to the audio data only when he can turn his attention thereto, for example after greeting the other person, when he fetches drinks for this person or the like.

The hearing device system according to the invention has, in every case, the above-described hearing device of the hearing device wearer and also a control unit that is configured to perform the above-described method, preferably independently, possibly in interaction with the hearing device wearer.

The hearing device system has the advantages described above and the physical features resulting from the method according the invention in equal measure.

In a preferred embodiment, the hearing device system has the above-described electronic device, preferably mobile device, which is assigned to the hearing device wearer when used as intended, in particular the smartphone or tablet. At least part of the control unit is implemented on this device (mobile device), preferably in the form of a software application ("app"). In addition, the mobile device is configured to communicate with the hearing device. Furthermore, the hearing device system has a network router, to which the mobile device is connected when operated as intended. Additionally, the hearing device system—at least to perform the above-described method—also has the above-described query service, which is configured to communicate with the mobile device (optionally indirectly via the router) and at least one social network.

The query service is in particular a preferably "intermediary infrastructure element", which is for example a central entity provided by the hearing device manufacturer or a service provider, that can be accessed by multiple devices of respective different hearing device wearers. The query service is preferably a software application implemented executably on a server, preferably on a cloud computer center. By way of example, this query service is provided as a "containerized" application. For the performance of the above-described method, the query service's entity provided (or "started") for the respective hearing device wearer should thus preferably be considered part of the hearing device system.

The control unit, at least the part thereof that is implemented on the mobile device, undertakes in particular the detection of the information that is characteristic of the encounter, the derivation of the (possibly imminent) encounter from this information, the comparison of the information against the contacts of the hearing device wearer and the making of the enquiry with the query service. Additionally, this part of the control unit undertakes the forwarding of the information provided by the query service, which is in particular already available as audio data, to the hearing device.

The conjunction "and/or" is intended to be understood here and below to mean in particular that the features combined by means of this conjunction may be formed either jointly or as alternatives to one another.

Also, the hearing device wearer is referred to by personal pronouns in the masculine form, with "he" and "him." These pronouns should be understood as being neutral and in no way have a limiting effect.

Other features which are considered as characteristic for the invention are set forth in the appended claims.

Although the invention is illustrated and described herein as embodied in a method for operating a hearing device system, and a hearing device system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Mutually corresponding parts are provided with the same reference signs throughout the figures.

DETAILED DESCRIPTION OF THE INVENTION

Figure 1:
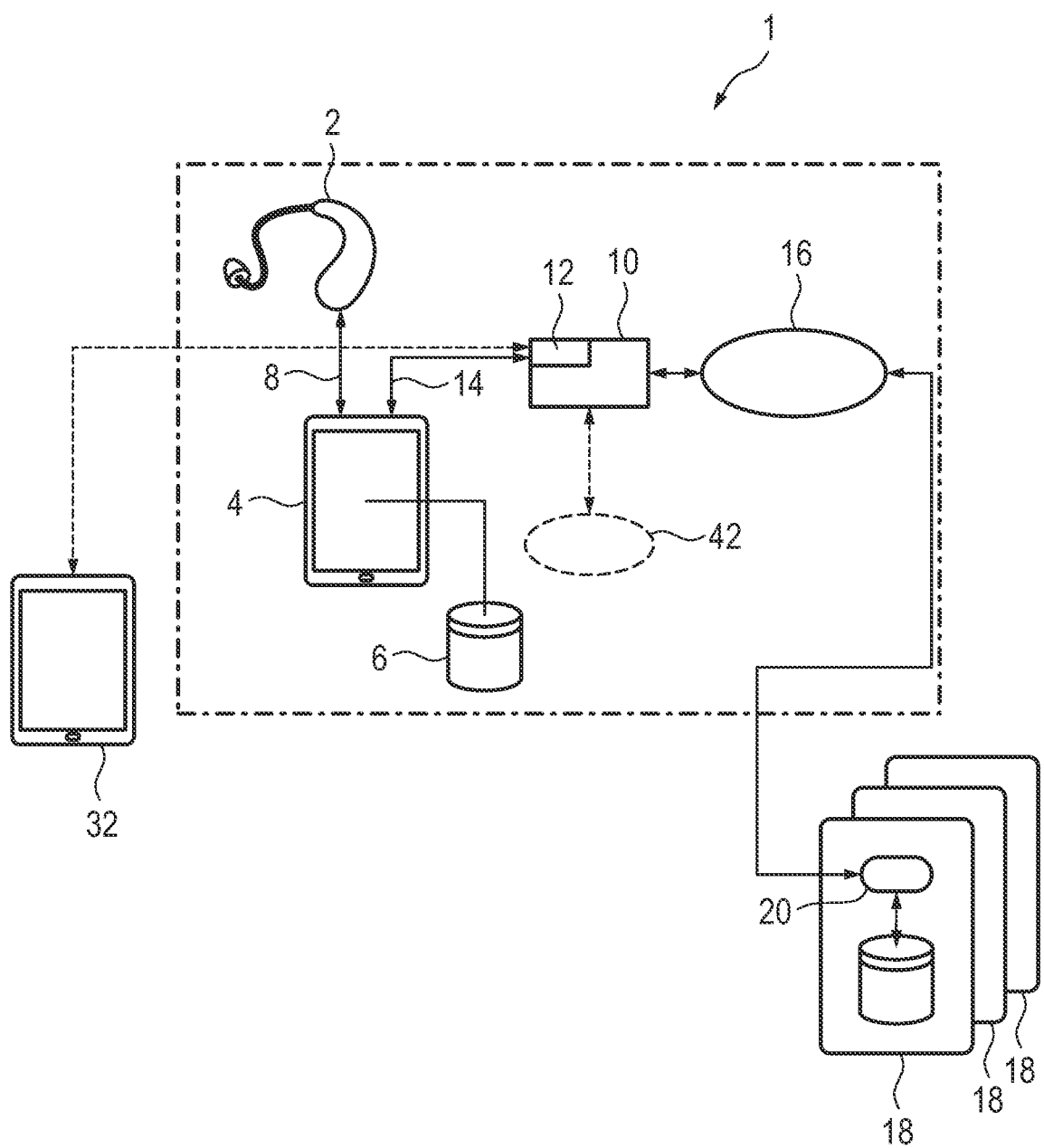
FIG. 1 shows a schematic depiction of a hearing device system as it is being operated as intended.

Referring now to the figures of the drawing in detail and first, in particular, to FIG. 1 thereof, there is shown a schematic view of a hearing device system 1. The hearing device system 1 is depicted with a dashed border and comprises at least one hearing device 2 associated with, i.e. used by, a user (subsequently: hearing device wearer). Optionally, it may also be a pair of binaural hearing devices. Furthermore, the hearing device system 1 comprises a smartphone 4 as an electronic (mobile) device of the hearing device wearer. A software application (subsequently "app") is installed for execution on the smartphone and forms part of a control unit of the hearing device system 1. This control unit is configured to perform a method, which is described in more detail below. A contact database 6 containing names and addresses ("contact data") of people known to the hearing device wearer is stored or linked on the smartphone 4 in customary fashion. The smartphone 4 and the hearing device 2 are configured to communicate among one another and, when operated as intended, connected to one another—specifically by means of a radio connection 8 (for example based on the Bluetooth standard)—for the purpose of data interchange.

The hearing device system 1 additionally has—at least when operated as intended—a router 10, which is configured to provide a home local area network of the hearing device wearer. To this end, the router 10 provides a so-called "wireless access point 12," on which, when operated as intended, the smartphone 4 of the hearing device wearer is registered by means of a further radio connection 14. Furthermore, the hearing device system 1 has a query service 16, at least one entity, started specifically for the respective hearing device system 1 when accessed, that is hosted on a cloud computing center. The app is connected to this query service 16 via the router 10. The query service 16 is in turn configured so as, among other things, to make enquiries with social networks 18 about background information pertaining to specific people and to receive appropriate responses from the social networks.

In an optional exemplary embodiment the query service 16 makes the enquiries using so-called "third party software modules 20" hosted on the respective social network 18. These can—when used—likewise be considered part of the hearing device system 1 in the same way as the applicable entity of the query service 16.

The hearing device system 1 is configured so as, when the hearing device wearer encounters another person, to detect the encounter, to identify the other person, to obtain background information pertaining to this person from the social networks 18 and to make this background information available to the hearing device wearer.

Figure 2:
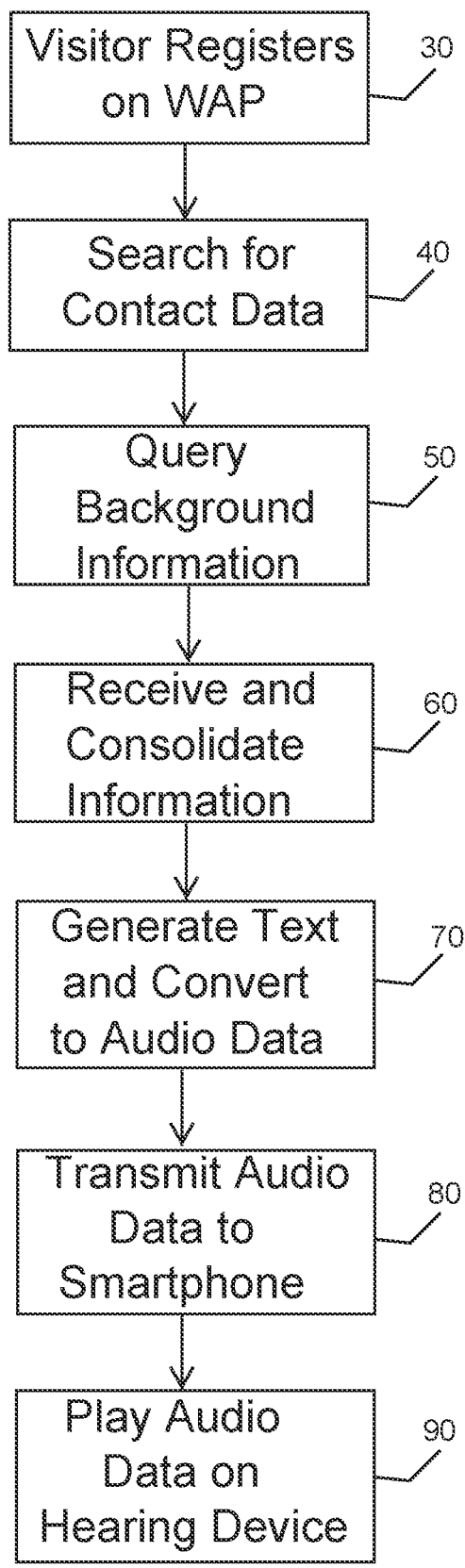
FIG. 2 shows a schematic flowchart of a method performed by the hearing device system.

Referring now to FIG. 2, in a first method step 30 (see FIG. 2) the app installed on the smartphone 4 of the hearing device wearer detects when—specifically in the event of a person visiting the hearing device wearer—a mobile electronic terminal, specifically a smartphone 32 of this person (subsequently: "the visitor"), registers on the wireless access point 12 of the router 10 of the hearing device wearer—possibly with the application being approved by the hearing device wearer. When registration is performed the router 10 sends all network subscribers—that is to say including the smartphone 4—a unique identifier, normally what is known as the MAC address, of the smartphone 32 of the visitor. Reception of this identifier on the smartphone 4 is used by the app as information characteristic of the hearing device wearer and the visitor currently having an encounter.

In a second method step 40 the app then searches the contact data of the hearing device wearer, that is to say the contact database 6, for contact data associated with the identifier. If this is the first visit, the app optionally asks the hearing device wearer to input the person whose smartphone 32 was recently registered on the router 10. If available, the app subsequently transmits the contact data of the visitor to the query service 16.

In an alternative exemplary embodiment—in the event of the first visit and hence the first time the smartphone 32 of the visitor logs in on the router 10—a web service 42 is used to display on the smartphone 32 of the visitor a website that asks the visitor to input his person (that is to say the name and the like). Using this information, the app subsequently searches the contact data of the hearing device wearer for the contact data associated with the visitor. The web service 42, at least the applicable entity thereof, can—when used—also be considered part of the hearing device system 1 analogously to the query service 16.

In a further method step 50 the query service 16 creates an enquiry regarding the background information (for example when the last exam, the last sports competition, the wedding or the like, what the last postings, blog entries, etc., were) pertaining to the visitor. This enquiry is forwarded by the query service 16 to various social networks 18, optionally to the associated third party software modules 20 hosted there.

In a further method step 60 the query service 16 receives, possibly via the respective third party software modules 20, responses from the social networks 18 that potentially contain the requested background information. The query service 16 then consolidates the information received with the responses in respect of date and relevance. By way of example, duplicate information resulting from combination of the data from different social networks 18 is erased, the received data are put into chronological order and—if not already taken into consideration by the enquiry—only data with a date more recent than the last query that is possibly available are taken into consideration. In addition, the query service 16 uses only information that the hearing device wearer has identified as being of interest to the specific visitor (or a group of people, for example relatives), for example when configuring the app or in a digital notebook.

In a subsequent method step 70 the query service 16 creates a text about the visitor from the consolidated data and converts it into audio data (in particular by means of conventional text-to-speech methods).

The query service 16 subsequently transmits these audio data to the smartphone 4 of the hearing device wearer in a method step 80.

In a method step 90 the smartphone 4, that is to say specifically the app (in particular via the hearing device 2, preferably by means of a spoken announcement, alternatively by means of a display on the display of the smartphone 4), asks the hearing device wearer whether the audio data are supposed to be played back. If the hearing device wearer confirms this, the smartphone 4 sends the audio data to the hearing device 2 via the radio connection 8, and the hearing device plays the audio data to the hearing device wearer.

The subject of the invention is not restricted to the exemplary embodiments described above. On the contrary, further embodiments of the invention can be derived from the description above by a person skilled in the art. In particular, the individual features of the invention that are described on the basis of the different exemplary embodiments, and the variant configurations of said invention, can also be combined in a different way.

The following is a summary list of reference numerals and the corresponding structure used in the above description of the invention:
1 hearing device system
2 hearing device
4 smartphone
6 contact database
8 radio connection
10 router
12 wireless access point
14 radio connection
16 query service
18 social network
20 third party software module
30 method step
32 smartphone
40 method step
42 web service
50 method step
60 method step
70 method step
80 method step
90 method step

The invention claimed is:

1. A method of operating a hearing device system, the method comprising:
receiving information characteristic for an encounter between a hearing device wearer wearing a hearing device and another person;
the characteristic information for the encounter being an identifier transmitted when an electronic device of the other person registers on a local area network of the hearing device wearer;
or
the characteristic information for the encounter being an imminent event stored in an electronic calendar of the hearing device wearer;
taking the information as a basis for indicating that the hearing device wearer has met or is about to meet the other person;
collecting background information about the other person from at least one social network;
converting the background information about the other person into audio data, and
audibly presenting the audio data to the hearing device wearer by way of the hearing device of said hearing device wearer.

2. The method according to claim 1, wherein the electronic device of the other person is a mobile device.

3. The method according to claim 1, which comprises, when the characteristic information for the encounter is available, ascertaining whether the hearing device wearer is known to the other person.

4. The method according to claim 1, which comprises collecting the background information about the other person by making available identification data linked to the other person to a query service and distributing with the query service queries pertaining to the other person to various social networks.

5. The method according to claim 1, which comprises consolidating the collected background information about the person.

6. The method according to claim 5, which comprises consolidating the information with the query service before outputting the information to the hearing device wearer.

7. The method according to claim 5, wherein the step of consolidating comprises at least one process selected from the group consisting of date-based sorting, erasure of duplicate information, consideration of information only from a more recent date in relation to a preceding query or a reference date, and/or subject-based filtering.

8. The method according to claim 5, which comprises creating the audio data by the query service and transmitting the audio data to the hearing device.

9. The method according to claim 1, which comprises audibly presenting the audio data only after approval by the hearing device wearer.

10. A hearing device system, comprising:
at least one hearing device and a control unit configured to perform the method according to claim 1.

11. The hearing device system according to claim 10, comprising a mobile device assigned to the hearing device wearer, when used as intended, on which at least a part of said control unit is implemented and which is configured to communicate with the hearing device, a network router configured for connection to a mobile device of the other person when operated as intended, and a query service configured to communicate with the mobile device and with at least one social network.

* * * * *